(12) United States Patent
Son

(10) Patent No.: US 10,895,165 B2
(45) Date of Patent: Jan. 19, 2021

(54) DOUBLE-FLOW TYPE VOLUTE CASING HAVING STRUCTURE FOR CHANGING DIRECTION OF FLOW IN TURBINE INLET

(71) Applicant: Dong Hae Engineering Co., Ltd., Incheon (KR)

(72) Inventor: Young Son, Seoul (KR)

(73) Assignee: Dong Hse Engineering Co., Ltd., Incheon (KR)

( * ) Notice: Subject to any disclaimer, the term of this patent is extended or adjusted under 35 U.S.C. 154(b) by 21 days.

(21) Appl. No.: 16/426,666

(22) Filed: May 30, 2019

(65) Prior Publication Data
US 2020/0040758 A1    Feb. 6, 2020

(30) Foreign Application Priority Data

Jul. 31, 2018  (KR) .......................... 10-2018-0089452
May 30, 2019  (KR) .......................... 10-2019-0063539

(51) Int. Cl.
*F01D 9/02* (2006.01)
*F01D 17/12* (2006.01)

(52) U.S. Cl.
CPC ............. *F01D 17/12* (2013.01); *F01D 9/026* (2013.01)

(58) Field of Classification Search
CPC ................................ F01D 9/026; F01D 17/12
USPC ....................................................... 415/184
See application file for complete search history.

(56) References Cited

U.S. PATENT DOCUMENTS

| | | | | |
|---|---|---|---|---|
| 6,073,447 A * | 6/2000 | Kawakami | ............ | F01D 9/026 60/602 |
| 7,694,518 B2 * | 4/2010 | Whiting | ............... | F01D 9/026 60/602 |
| 8,226,358 B2 * | 7/2012 | Matsuo | ................... | F01D 9/026 415/151 |
| 8,585,355 B2 * | 11/2013 | Henderson | ............. | F01D 9/026 415/151 |
| 8,814,506 B2 * | 8/2014 | Matsuo | ................ | F01D 17/146 415/145 |

FOREIGN PATENT DOCUMENTS

| DE | 10112551 A1 * | 9/2001 | ............. F02B 37/22 |
|---|---|---|---|
| KR | 10-2015-0097576 A | 8/2015 | |

OTHER PUBLICATIONS

Ishihara, 2001, English translation of DE 10112551 A1 (Year: 2001).*

* cited by examiner

*Primary Examiner* — Justin D Seabe
*Assistant Examiner* — Michael L Sehn
(74) *Attorney, Agent, or Firm* — Novick, Kim & Lee, PLLC; Jae Youn Kim

(57) ABSTRACT

A double-flow type volute casing having a structure for changing the direction of flow in a turbine inlet is proposed. The volute casing includes a partition plate for partitioning a volute defined in the casing into an inner flow channel and an outer flow channel, provided so as to surround a turbine, a plurality of flow-rate adjustment holes formed in the partition plate so as to be arranged at a gradually decreasing interval such that a high-pressure fluid flowing in the outer flow channel is introduced into the inner flow channel and the fluid flowing in the inner flow channel is directed perpendicularly to the turbine blades, in order to minimize the amount of energy that is lost and to reduce imbalanced variation of torque applied to the turbine blades.

3 Claims, 3 Drawing Sheets

DOUBLE-FLOW TYPE VOLUTE CASING HAVING STRUCTURE FOR CHANGING DIRECTION OF FLOW IN TURBINE INLET

BACKGROUND OF THE INVENTION

Field of the Invention

The present invention relates to a volute casing, and more particularly to a double-flow type volute casing having a structure for changing the direction of flow in a turbine inlet, wherein pressure is uniformly applied to turbine blades in order to prevent the movement of the turbine blades and thus to realize stable rotational force of the turbine blades, whereby it is possible to improve the performance of the turbine blades and to increase the lifespan of the turbine blades.

Description of the Related Art

In general, a Francis turbine generator is configured to have a structure in which a generator for producing electricity and a hydraulic turbine, which is a rotary machine for converting the potential energy of water into mechanical energy, are installed at upper and lower positions along the same vertical line such that the generator produces electricity using the rotational force received from the hydraulic turbine.

Meanwhile, the Francis turbine is configured to have a volute casing structure, in which rotational force is generated by water introduced thereinto, the rotational force rotating the turbine blades based on the flow rate and head of the water, whereby a rotor of the generator is rotated to produce electricity.

In the conventional volute casing described above, however, excessive pressure of the fluid is applied in a rotary section into which the fluid is initially introduced. As a result, loss in the movement of the turbine blades is partially fluctuated, which is considerably problematic in that power production efficiency is reduced and the defect rate of the turbine is increased.

In order to solve the above problems, in recent years, a partition plate has been installed in a volute provided in the casing such that a fluid is introduced in the state of being divided into two equal parts in order to reduce pressure.

The above partition plate structure places great importance simply on partitioning the volute; however, pressure is reduced, and thus performance is deteriorated. In order to solve this problem, an apparatus that adjusts the amount of a fluid that is introduced into the turbine through an opening and closing structure using a valve has been developed. In small-sized products, however, the flow of the fluid is disturbed.

PRIOR ART DOCUMENT

Patent Document (PATENT DOCUMENT 0001) Korean Patent Application Publication No. 10-2015-0097576

SUMMARY OF THE INVENTION

The present invention has been made in view of the above problems, and it is an object of the present invention to provide a double-flow type volute casing having a structure for changing the direction of flow in a turbine inlet, wherein a partition plate for partitioning a volute defined in the casing into an inner flow channel and an outer flow channel is provided so as to surround a turbine, the ratio in sectional area of the inner flow channel to the outer flow channel in a volute inlet, into which a fluid is introduced, is 4:6, a plurality of flow-rate adjustment holes is formed in the partition plate so as to be arranged at a gradually decreasing interval such that a high-pressure fluid flowing in the outer flow channel is introduced into the inner flow channel and the fluid flowing in the inner flow channel is directed perpendicularly to the turbine blades, in order to minimize the amount of energy that is lost and to reduce imbalanced variation of torque applied to the turbine blades, whereby it is possible to prevent the generation of vibration and to obtain high rotational force based on the guarantee of stable output, and therefore it is possible to improve the performance of a hydraulic turbine and to increase the lifespan of the hydraulic turbine through the stable driving thereof.

In accordance with the present invention, the above and other objects can be accomplished by the provision of a double-flow type volute casing having a structure for changing the direction of flow in a turbine inlet, the volute casing having a turbine formed therein, the volute casing constituting a volute casing including a volute inlet provided as a vertical section thereof and a volute provided as a curved section thereof, wherein an inner flow channel and an outer flow channel are partitioned from each other through a partition plate so as to extend from the volute inlet to the volute section, the ratio in sectional area of the inner flow channel to the outer flow channel, the inner flow channel and the outer flow channel corresponding to the volute inlet and the volute section, is 4:6, whereby the pressure of the fluid flowing in the outer flow channel is greater than the pressure of the fluid flowing in the inner flow channel and thus the flow rate in the outer flow channel is greater than the flow rate in the inner flow channel, a partition plate is formed so as to extend from the volute inlet to the volute, a plurality of flow-rate adjustment holes is formed throughout a 180-degree section of the partition plate on the assumption that a start point of a tongue section, which is a point at which the fluid is initially introduced, from the center of the turbine is 0 degrees, a plurality of guide vanes for applying the pressure of the fluid to turbine blades is provided along the curvature of the partition plate at positions deviating from the 180-degree section of the partition plate in the rotational direction of the turbine so as to be spaced apart from each other by a predetermined distance, and the pressure of the fluid in the outer flow channel is applied to the inner flow channel through the flow-rate adjustment holes, whereby the ratio of the flow rate in the inner flow channel to the flow rate in the outer flow channel is 5:5 at an end point of the 180-degree section of the partition plate.

Each of the flow-rate adjustment holes may be inclined in order to supply the fluid, introduced from the outer flow channel into the inner flow channel through the flow-rate adjustment holes, perpendicularly to the turbine blades that are located throughout the 180-degree section of the partition plate.

At least one of the flow-rate adjustment holes may correspond to each of the turbine blades that are located throughout the 180-degree section of the partition plate.

The diameters of the flow-rate adjustment holes corresponding to each of the turbine blades may be configured so as to be gradually increased as the flow speed of the fluid is increased in the volute section that is narrowed, and a flow rate corresponding to 10% of 100% of the fluid introduced into the volute inlet may be equally divided and pass through the respective flow-rate adjustment holes, whereby the ratio of the flow rate in the inner flow channel to the flow rate in the outer flow channel is 5:5 in the 180-degree section of the partition plate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

It should be noted that terms or words used in this specification and the claims are not to be interpreted as having ordinary and dictionary-based meanings but as having meanings and concepts coinciding with the technical idea of the present invention based on the principle that the inventors may appropriately define the concepts of the terms in order to explain the invention in the best method.

Consequently, the embodiments described in this specification with reference to the accompanying drawings are merely the most preferred embodiments, and do not cover all technical ideas of the present invention, and therefore it should be understood that there may be various equivalents and modifications capable of substituting for the embodiments at the time of filing of the present application.

Hereinafter, a preferred embodiment of the present invention will be described in detail with reference to the accompanying drawings.

Figure 1:
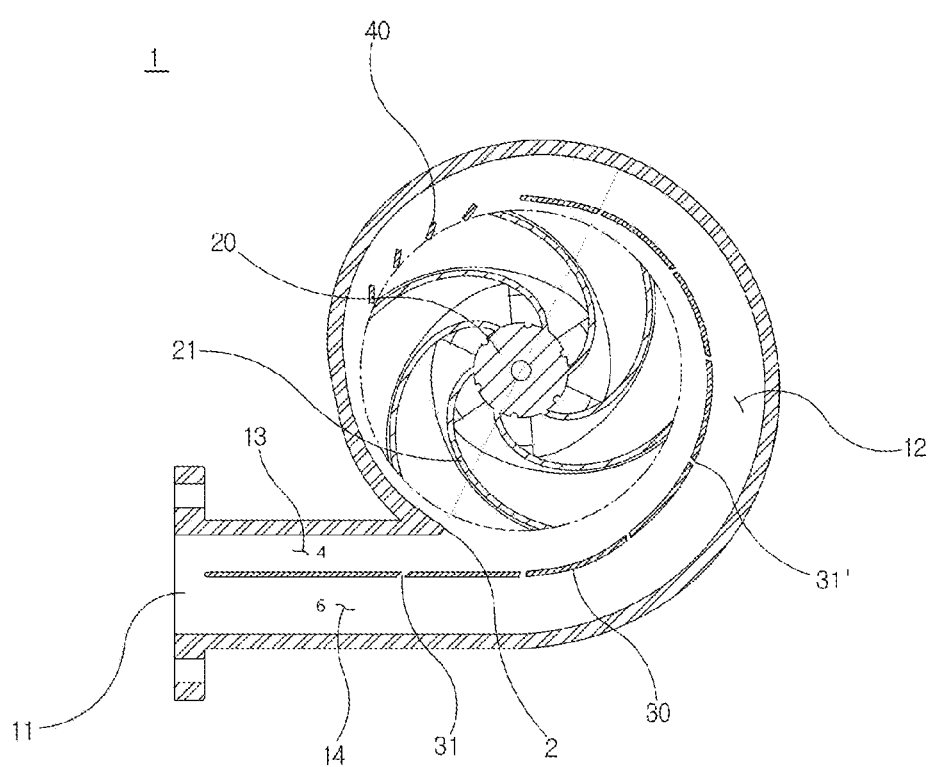
FIG. 1 is a general view showing a double-flow type volute casing having a structure for changing the direction of flow in a turbine inlet according to the present invention.

FIG. 1 is a general view showing a double-flow type volute casing having a structure for changing the direction of flow in a turbine inlet according to the present invention.

As shown in FIG. 1, a turbine 20 is formed in the double-flow type volute casing 1 having the structure for changing the direction of flow in the turbine inlet according to the present invention, and in order to constitute a volute casing including a volute inlet 11 provided as a vertical section thereof and a volute 12 provided as a curved section thereof, a partition plate 30 is formed around the center of the volute casing 1 so as to extend from the volute inlet 11 to the volute 12 section such that an inner flow channel 13 and an outer flow channel 14 are partitioned from each other.

That is, the double-flow type volute casing 1 having the structure for changing the direction of flow in the turbine inlet according to the present invention is configured such that a fluid introduced into the volute inlet 11 is distributed from the volute inlet 11 into the inner flow channel 13 and the outer flow channel 14 by the partition plate 30.

Meanwhile, the double-flow type volute casing having the structure for changing the direction of flow in the turbine inlet according to the present invention is configured such that the ratio in sectional area of the inner flow channel 13 to the outer flow channel 14, the inner flow channel 13 and the outer flow channel 14 corresponding to the volute inlet 11, is 4:6, whereby the flow rate in the outer flow channel 14 is greater than the flow rate in the inner flow channel 13 and thus the pressure of the fluid flowing in the outer flow channel 14 is greater than the pressure of the fluid flowing in the inner flow channel 13.

In addition, the double-flow type volute casing having the structure for changing the direction of flow in the turbine inlet according to the present invention is configured such that a plurality of flow-rate adjustment holes 31 and 31', through which the inner flow channel 13 and the outer flow channel 14 communicate with each other, is formed through the partition plate 30.

The flow-rate adjustment holes 31 and 31' are formed throughout a 180-degree section of the partition plate 30 on the assumption that the start point of a tongue section 2, which is the point at which the fluid is initially introduced, from the center of the turbine 20 is 0 degrees.

That is, in the present invention, the fluid introduced into the volute inlet 11 is distributed into the inner flow channel 13 and the outer flow channel 14, and fluid components have different pressures during the distribution of the fluid. The fluid in the outer flow channel 14, the pressure of which is high, is introduced into the inner flow channel 13 through the flow-rate adjustment holes 31 and 31'. At this time, pressure is applied to turbine blades 21 in order to increase the rotational force of the turbine blades.

The double-flow type volute casing having the structure for changing the direction of flow in the turbine inlet according to the present invention is configured such that each of the flow-rate adjustment holes 31 and 31' is inclined in order to supply the fluid, introduced from the outer flow channel 14 into the inner flow channel 13, perpendicularly to the turbine blades 21 that are located throughout the 180-degree section of the partition plate 30. That is, in the perpendicular supply structure, as described above, the pressure of the fluid introduced into the inner flow channel 13 is applied to each of the turbine blades 21 in the perpendicular direction in order to increase the rotational force of the turbine blades.

Meanwhile, the double-flow type volute casing having the structure for changing the direction of flow in the turbine inlet according to the present invention may be configured such that at least one of the flow-rate adjustment holes 31 and 31' corresponds to each of the turbine blades 21 that are located throughout the 180-degree section of the partition plate 30.

In an example, on the assumption that three turbine blades 21 are located throughout the 180-degree section of the partition plate 30, two of the flow-rate adjustment holes 31 and 31' may be formed so as to correspond to each of the turbine blades 21 in order to apply pressure to each of the turbine blades 21. In the case in which the number of flow-rate adjustment holes 31 and 31' is increased, the pressure applied to each of the turbine blades 21 is increased, whereby the rotational force of each of the turbine blades 21 is also increased.

Figure 2:
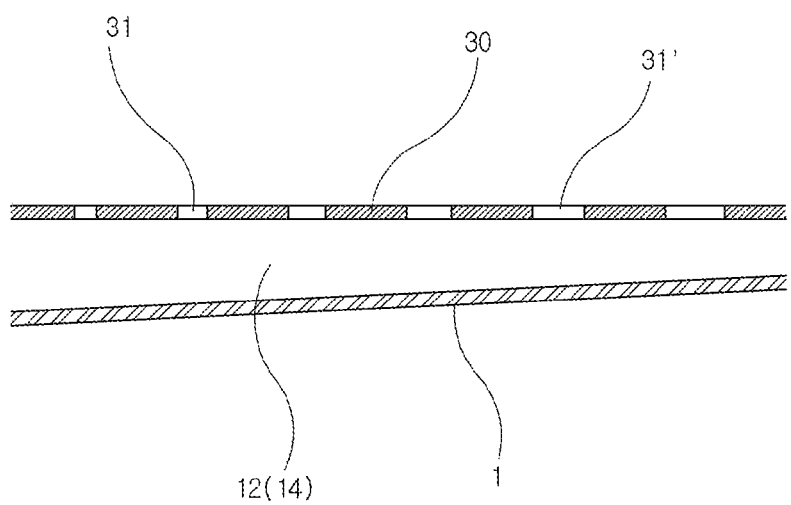
FIG. 2 is a schematic view showing flow-rate adjustment holes in the double-flow type volute casing having the structure for changing the direction of flow in the turbine inlet according to the present invention.

In addition, referring to FIG. 2, the double-flow type volute casing having the structure for changing the direction of flow in the turbine inlet according to the present invention is preferably configured such that the flow-rate adjustment holes 31 and 31' corresponding to each of the turbine blades 21 have different diameters.

The reason for this is that, in the case in which the diameter of the volute 12 is gradually decreased, the flow speed in the outer flow channel 14 is also increased. Consequently, the double-flow type volute casing having the structure for changing the direction of flow in the turbine inlet according to the present invention is preferably configured such that the area of the outer flow channel 14 is increased as the flow speed in the outer flow channel 14 is increased, whereby the flow rates through the respective flow-rate adjustment holes 31 and 31' are the same. The double-flow type volute casing having the structure for changing the direction of flow in the turbine inlet according to the present invention is configured such that the fluid in the outer flow channel 14 corresponding to 10% of 100% of the fluid, introduced into the volute inlet 12, is introduced into the inner flow channel 13 through the flow-rate adjustment holes 31 and 31', whereby the ratio of the flow rate in the inner flow channel 13 to the flow rate in the outer flow channel 14 is 5:5 at the end point of the 180-degree section of the partition plate 30.

That is, in the present invention, the flow rate at a point of introduction from the outer flow channel 14 into the inner flow channel 13 is equally divided and is sequentially introduced such that the same pressure of the fluid is applied to the respective turbine blades 21, whereby it is possible to prevent the movement of the turbine blades 21 due to an abrupt change in the pressure of the fluid.

In addition, the double-flow type volute casing having the structure for changing the direction of flow in the turbine inlet according to the present invention is configured such that a plurality of guide vanes 40 for applying the pressure of the fluid to the turbine blades 21 is provided along the curvature of the partition plate 30 at positions deviating from the 180-degree section of the partition plate 30 in the rotational direction of the turbine 20 so as to be spaced apart from each other by a predetermined distance. The guide vanes 40 are configured to face the turbine blades 21.

That is, the guide vanes 40 stably guides the fluid flowing in the outer flow channel 14 toward the turbine blades 21 in order to apply additional pressure to the turbine blades 21 and guarantee stable rotation of the turbine blades 21.

Hereinafter, the operation of the double-flow type volute casing having the structure for changing the direction of flow in the turbine inlet according to the present invention having the above construction will be described in detail with reference to the accompanying drawings.

Referring to FIG. 1, in the double-flow type volute casing 1 having the structure for changing the direction of flow in the turbine inlet according to the present invention, a high-pressure fluid, introduced into the outer flow channel 14 in the process in which the fluid is introduced into the volute inlet 11, is introduced into the inner flow channel 13 through the flow-rate adjustment holes 31 and 31' in the process in which the fluid flows in the volute 12, and the direction of flow of the fluid flowing in the inner flow channel 13 is changed by the pressure of the introduced fluid, whereby the pressure is applied to the turbine blades 21.

Figure 3:
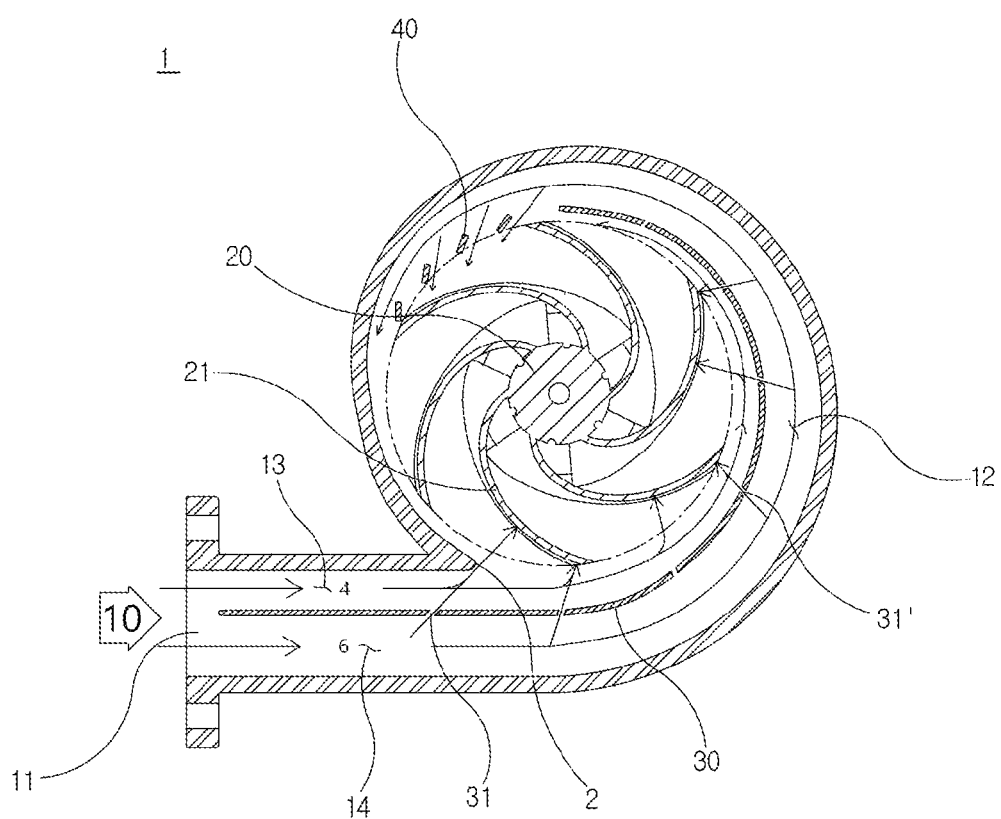
FIG. 3 is a view showing the state in which a fluid flows in the double-flow type volute casing having the structure for changing the direction of flow in the turbine inlet according to the present invention.

That is, referring to FIG. 3, the direction of flow of the fluid flowing in the inner flow channel 13 is changed by the pressure of the fluid introduced from the outer flow channel 14 through the flow-rate adjustment holes 31 and 31' due to the pressure difference such that the fluid flowing in the inner flow channel 13 is directed perpendicularly to the turbine blades 21, whereby the pressure of the fluid is applied to the turbine blades 21.

In particular, the flow rate at a point of introduction through the respective flow-rate adjustment holes 31 and 31' is uniformly applied to the respective turbine blades 21 throughout the 180-degree section of the partition plate 30. Since uniform pressure of the fluid is applied to the respective turbine blades 21, it is possible to reduce imbalanced variation in torque generated when the fluid is applied to the turbine blades 21, and at the same time it is possible to prevent vibration of the turbine blades 21. In particular, it is possible to obtain increased rotational force through the application of the pressure.

In the double-flow type volute casing 1 having the structure for changing the direction of flow in the turbine inlet according to the present invention, as described above, it is possible to uniformly apply pressure to the turbine blades in the process in which the fluid flows in the volute through pressure variation in the fluid introduced into the volute inlet, whereby it is possible to prevent the movement of the turbine blades and to realize stable rotational force of the turbine blades. Consequently, it is possible to improve the performance of the hydraulic turbine and to increase the lifespan of the hydraulic turbine.

As is apparent from the above description, the double-flow type volute casing 1 having the structure for changing the direction of flow in the turbine inlet according to the present invention is configured such that the fluid flowing in the outer flow channel of the volute is transmitted to the inner flow channel through the partition plate and the flow-rate adjustment holes, whereby the pressure of the fluid is applied perpendicularly to the turbine blades. Consequently, it is possible to obtain effects in which stable hydraulic pressure is applied to the turbine blades, whereby the movement of the turbine blades is prevented, and in which rotational force is stable while the amount of rotational force is remarkably increased, whereby the power generation performance of the hydraulic turbine is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A double-flow volute casing having a structure for changing a direction of flow in a turbine inlet, the volute casing comprising:
   a turbine disposed therein;
   a volute inlet disposed in a vertical section of the volute casing;
   a volute section disposed in a curved section of the volute casing;
   an inner flow channel and an outer flow channel partitioned from each other through a partition plate so as to extend from the volute inlet to the volute section, wherein a ratio in a sectional area of the inner flow channel to the outer flow channel, the inner flow channel and the outer flow channel corresponding to the volute inlet and the volute section, is 4:6, and wherein a pressure of fluid flowing in the outer flow channel is greater than a pressure of fluid flowing in the inner flow channel and thus a flow rate in the outer flow channel is greater than a flow rate in the inner flow channel;
   a partition plate disposed to extend from the volute inlet to the volute section;
   a plurality of flow-rate adjustment holes disposed throughout a 180-degree section of the partition plate; and
   a plurality of guide vanes for applying the pressure of the fluid to turbine blades, the plurality of guide vanes being disposed along a curvature of the partition plate at positions deviating from the 180-degree section of the partition plate in a rotational direction of the turbine so as to be spaced apart from each other by a predetermined distance, wherein the pressure of the fluid in the outer flow channel is applied to the inner flow channel through the plurality of flow-rate adjustment holes, wherein a ratio of the flow rate in the inner flow channel to the flow rate in the outer flow channel is 5:5 at an end point of the 180-degree section of the partition plate, wherein diameters of the plurality of flow-rate adjustment holes are gradually increased as a flow speed of the fluid is increased in the volute section that is narrowed, and wherein a flow rate corresponding to 10% of 100% of the fluid, introduced into the volute inlet, is equally divided and passes through the respective plurality of flow-rate adjustment holes.

2. The double-flow volute casing according to claim 1, wherein each of the plurality of flow-rate adjustment holes is inclined in order to supply the fluid, introduced from the outer flow channel into the inner flow channel through the plurality of flow-rate adjustment holes, perpendicularly to the turbine blades that are located throughout the 180-degree section of the partition plate.

3. The double-flow volute casing according to claim 1, wherein at least one of the plurality of flow-rate adjustment holes corresponds to at least one of the turbine blades that are located throughout the 180-degree section of the partition plate.

* * * * *